(12) United States Patent
Choi et al.

(10) Patent No.: US 9,611,171 B2
(45) Date of Patent: *Apr. 4, 2017

(54) HEATING ELEMENT AND MANUFACTURING METHOD THEREOF

(75) Inventors: Hyeon Choi, Daejeon (KR); Su-Jin Kim, Daejeon (KR); Ji-Young Hwang, Daejeon (KR); Seung-Tae Oh, Daejeon (KR); Ki-Hwan Kim, Daejeon (KR); Sang-Ki Chun, Daejeon (KR); Young-Jun Hong, Daejeon (KR); In-Seok Hwang, Daejeon (KR); Dong-Wook Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/934,605

(22) PCT Filed: Mar. 17, 2009

(86) PCT No.: PCT/KR2009/001336
§ 371 (c)(1),
(2), (4) Date: Sep. 24, 2010

(87) PCT Pub. No.: WO2009/151203
PCT Pub. Date: Dec. 17, 2009

(65) Prior Publication Data
US 2011/0017726 A1    Jan. 27, 2011

(30) Foreign Application Priority Data

Jun. 13, 2008 (KR) .................. 10-2008-0055807
Nov. 27, 2008 (KR) .................. 10-2008-0119121
Nov. 27, 2008 (KR) .................. 10-2008-0119122

(51) Int. Cl.
C03C 17/34    (2006.01)
H05B 3/84    (2006.01)

(52) U.S. Cl.
CPC ............... *C03C 17/34* (2013.01); *H05B 3/84* (2013.01); *H05B 2203/017* (2013.01)

(58) Field of Classification Search
CPC ...... C03C 17/34; H05B 2203/017; H05B 3/84
(Continued)

(56) References Cited

U.S. PATENT DOCUMENTS 3,729,616 A * 4/1973 Gruss et al. .................. 219/522
3,851,581 A * 12/1974 Baum et al. .................. 430/308
(Continued)

FOREIGN PATENT DOCUMENTS

DE    3323670    1/1985
DE    3708577    9/1988
(Continued)

OTHER PUBLICATIONS

Office Action of Chinese Patent Office in Application No. 200980112076.0, dated Mar. 8, 2013.
(Continued)

*Primary Examiner* — David Angwin
*Assistant Examiner* — Frederick Calvetti
(74) *Attorney, Agent, or Firm* — Dentons US LLP

(57) ABSTRACT

Provided are a heating element that includes: a transparent substance; a conductive heating line that is provided on at least one side of the transparent substance; bus bars that is electrically connected to the conductive heating line; and a power portion that is connected to the bus bars, wherein 30% or more of the entire area of the transparent substance has a conductive heating line pattern that is formed of closed figures where a distribution is continuous and a ratio (area distribution ratio) of a standard deviation in respects to an average value of areas of the closed figures is 2% or more, and a method for manufacturing the same.

7 Claims, 8 Drawing Sheets

(58) Field of Classification Search
USPC .... 219/610.1, 611, 612, 620, 621, 203, 522, 219/543, 548; 29/428, 469, 831, 851, 885
See application file for complete search history.

(56) References Cited

U.S. PATENT DOCUMENTS

| | | | | |
|---|---|---|---|---|
| 4,964,068 | A | * | 10/1990 | Matsushita et al. ............ 358/1.3 |
| 4,971,848 | A | * | 11/1990 | Ruelle et al. .................. 428/38 |
| 5,798,499 | A | | 8/1998 | Shibata et al. |
| 6,011,244 | A | * | 1/2000 | Castle et al. .................. 219/522 |
| 6,914,224 | B2 | * | 7/2005 | Gillner et al. ................ 219/522 |
| RE39,044 | E | * | 3/2006 | Ross .............................. 427/152 |
| 7,129,444 | B2 | * | 10/2006 | Weiss ............................ 219/203 |
| 7,656,357 | B2 | * | 2/2010 | Ishibashi et al. ............. 343/713 |
| 8,022,334 | B2 | * | 9/2011 | Baumler ....................... 219/203 |
| 2002/0015824 | A1 | * | 2/2002 | Kawamoto et al. .......... 428/156 |
| 2005/0252908 | A1 | | 11/2005 | Weiss |
| 2006/0292938 | A1 | * | 12/2006 | Schwenke et al. ........... 439/876 |
| 2007/0187383 | A1 | * | 8/2007 | Wipfler et al. ................ 219/203 |
| 2007/0207297 | A1 | * | 9/2007 | Lee ........................ H05K 3/045 428/209 |
| 2008/0152926 | A1 | * | 6/2008 | Baikerikar et al. ......... 428/422.8 |
| 2009/0140938 | A1 | | 6/2009 | Ishibashi et al. |
| 2010/0059365 | A1 | * | 3/2010 | Valentin et al. .............. 204/280 |
| 2010/0213183 | A1 | * | 8/2010 | Schall ............................ 219/203 |
| 2011/0017726 | A1 | | 1/2011 | Choi et al. |
| 2011/0240343 | A1 | * | 10/2011 | Zagdoun et al. ............. 174/250 |
| 2011/0247859 | A1 | * | 10/2011 | Zagdoun et al. ............. 174/250 |
| 2011/0250387 | A1 | * | 10/2011 | Zagdoun et al. ............. 428/131 |

FOREIGN PATENT DOCUMENTS

| | | | |
|---|---|---|---|
| EP | 0 594 932 B1 | | 6/1998 |
| FR | 2263657 | * | 3/1975 |
| FR | 2263657 | | 10/1975 |
| FR | 0753972 | * | 9/2008 |
| GB | 2091528 | | 7/1982 |
| JP | 03-037056 U | | 4/1991 |
| JP | 1991-0037056 U | | 10/1991 |
| JP | 08-72674 A | | 3/1996 |
| JP | 11322361 A | | 11/1999 |
| JP | 2001-100235 A | | 4/2001 |
| JP | 2005-294006 | | 3/2004 |
| JP | 2005-100695 | | 4/2005 |
| JP | 2006-24500 A | | 1/2006 |
| JP | 2006-24501 A | | 1/2006 |
| JP | 2006024501 | * | 1/2006 |
| JP | 2006-168728 A | | 6/2006 |
| JP | 2007-237807 A | | 9/2007 |
| JP | 2007-537927 A | | 12/2007 |
| JP | 2007537927 | * | 12/2007 |
| JP | 2008044800 A | | 2/2008 |
| JP | 2011-500697 | | 4/2011 |
| JP | 2011-500697 A | | 6/2011 |
| KR | 20-0287050 | | 8/2002 |
| KR | 20-0287050 Y1 | | 8/2002 |
| KR | 10-2004-0012792 | | 2/2004 |
| KR | 2005-0011766 | | 1/2005 |
| KR | 10-2006-129420 A | | 12/2006 |
| KR | 10-2006-0129420 A | | 12/2006 |
| KR | 10-2007-0107442 A | | 11/2007 |
| KR | 10-2006-0004556 A | | 1/2008 |
| KR | 200800004556 | * | 1/2008 |

OTHER PUBLICATIONS

Office Action of Chinese Patent Office in Application No. 200980112070.3. dated Mar. 8, 2013.

Office Action of Chinese Patent Office in Appl'n No. 200980112076.0 dated Jan. 30, 2014.

* cited by examiner

Figure 2
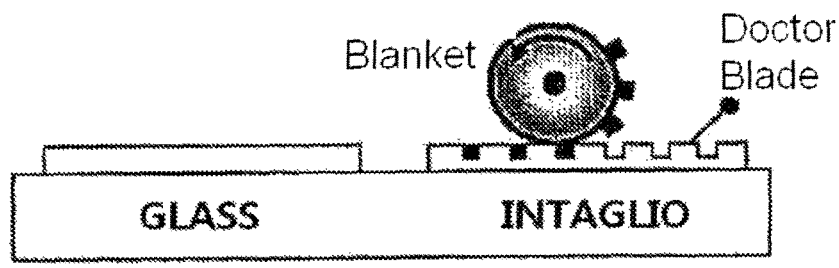
1. FIRST TRANSFER BY ROTATING BLANKET AFTER PASTE IS FILLED IN THE PATTERN OF THE INTAGLIO BY USING THE DOCTOR BLADE
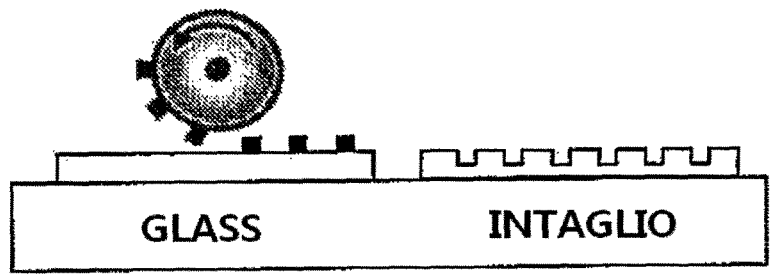
2. SECOND TRANSFER ON GLASS SURFACE BY ROTATING BLANKET
Figure 3
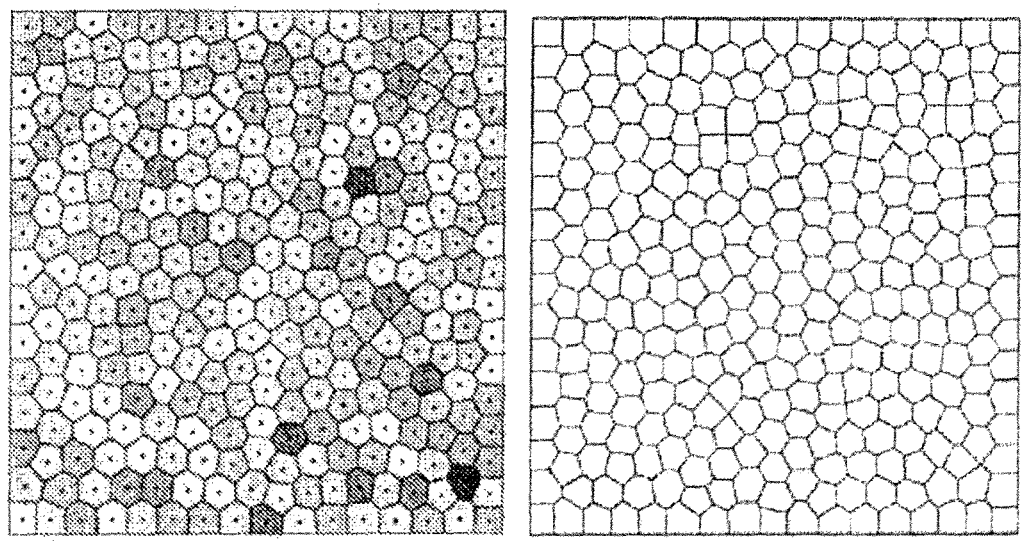

Figure 12]
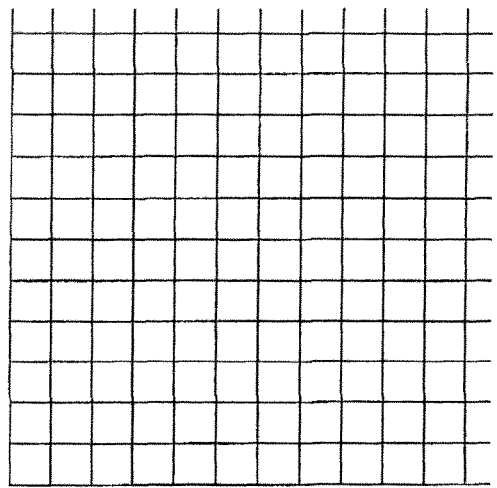
Figure 13
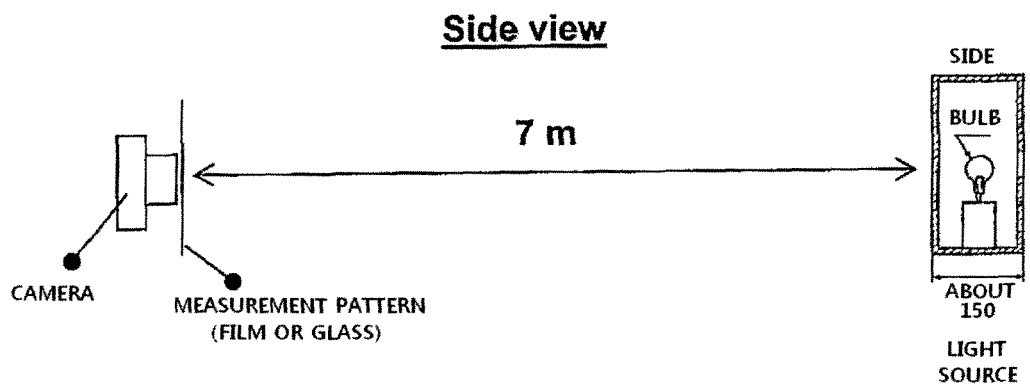

Figure 14
| EXPERIMENTAL EXAMPLE NO. | COMPARATIVE EXAMPLE 1 | EXAMPLE 1 | EXAMPLE 4 |
|---|---|---|---|
| Pattern | 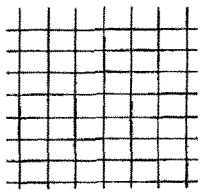 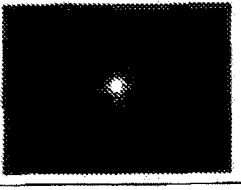 | 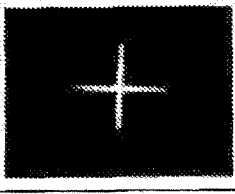 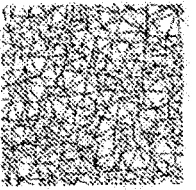 | 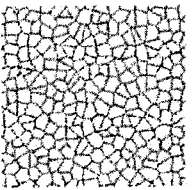 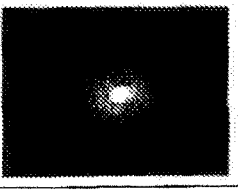 |
| SCATTERING DEVIATION | 19.5 | 2.0 | 1.5 |

HEATING ELEMENT AND MANUFACTURING METHOD THEREOF

This application is a 35 U.S.C. §371 National Stage entry of International Application No. PCT/KR2009/001336 filed Mar. 17, 2009, which claims priority to Korean Application No. 10-2008-0055807 filed on Jun. 13, 2008; Korean Application No. 10-2008-0119121 filed on Nov. 27, 2008 and Korean Application No. 10-2008-0119122 filed on Nov. 27, 2008, all of which are hereby incorporated by reference for all purposes as if fully set forth herein in their entireties.

TECHNICAL FIELD

The present invention relates to a heating element and a method for manufacturing the same. More particularly, the present invention relates to a heating element that includes a pattern that is not well visible, has excellent heating performance at a low voltage, and is capable of minimizing diffraction and interference of light, and a method for manufacturing the same.

BACKGROUND ART

In winter or rainy day, frost is formed on a glass surface of a vehicle because of a difference between temperatures of the outside and inside of the vehicle. In addition, in the case of an indoor ski resort, a freezing phenomenon occurs because of a difference between temperatures of the inside where there is a slope and the outside of the slope. In order to solve this, a heating glass has been developed. The heating glass uses a concept where after a hot line sheet is attached to the glass surface or a hot line is directly formed on the glass surface, a current is applied to both terminals of the hot line to generate heat from the hot line, thereby increasing the temperature of the glass surface. It is important that the heating glass for vehicle or construction has low resistance in order to smoothly generate heat, but it should not be offensive to human eye. Accordingly, methods for manufacturing a known transparent heating glass by forming a heating layer through a sputtering process using a transparent conductive material such as ITO (Indium Tin Oxide) or Ag thin film and connecting an electrode to a front end thereof have been proposed. However, the heating glass according to the above method has a problem in that it is difficult to drive it at a low voltage of 40 V or less because of high surface resistance.

DISCLOSURE

Technical Problem

In order to solve the above problems, the present invention has been made in an effort to provide a heating element that is not well visible, can minimize side effects by diffraction and interference of single light source after sunset and has excellent heating performance at a low voltage, and a method for manufacturing the same.

Technical Solution

In order accomplish the above object, an exemplary embodiment of the present invention provides a heating element comprising a transparent substance; a conductive heating line that is provided on at least one side of the transparent substance; bus bars that is electrically connected to the conductive heating line; and a power portion that is connected to the bus bars, wherein 30% or more of the entire area of the transparent substance has a conductive heating line pattern in which is formed of closed figures where a distribution is continuous and a ratio (area distribution ratio) of a standard deviation in respects to an average value of areas of the closed figures is 2% or more.

Another exemplary embodiment of the present invention provides a method for manufacturing a heating element, which includes: forming a conductive heating line on a transparent substance; forming bus bars that is electrically connected to the conductive heating line; and forming a power portion that is connected to the bus bars, wherein, on 30% or more of the entire area of the transparent substance, the conductive heating line is formed in a pattern that is formed of closed figures in which distributions are continuous and a ratio (distance distribution ratio) of standard deviation in respects to an average value of areas of the closed figures is 2% or more. The conductive heating line may be formed by using a printing method, a photolithography method, a photography method, a method using a mask, a sputtering method, or an inkjet method.

Advantageous Effects

According to the exemplary embodiments of the present invention, the heating element can minimize side effects by diffraction and interference of single light source after sunset, has excellent heating performance at a low voltage and is not well visible. In addition, according to the exemplary embodiments of the present invention, since the heating element can be formed by using various methods such as using a printing method, a photolithography method, a photography method, a method using a mask, a sputtering method, or an inkjet method after a desired pattern is previously set, the process is easily performed and the cost is low.

DESCRIPTION OF DRAWINGS

FIG. 2 is a view that illustrates an offset printing process.

FIG. 3 illustrates forming the pattern by using the Voronoi diagram according to an exemplary embodiment of the present invention.

FIG. 12 illustrates the conductive heating line pattern of the heating element according to the related art.

FIG. 13 illustrates an equipment configuration for measuring the intensity of light that passes through the heating element according to an exemplary embodiment of the present invention.

FIG. 14 illustrates the measurement results of scattering properties of the heating bodies that are manufactured in Examples and Comparative Examples.

BEST MODE

Figure 1:
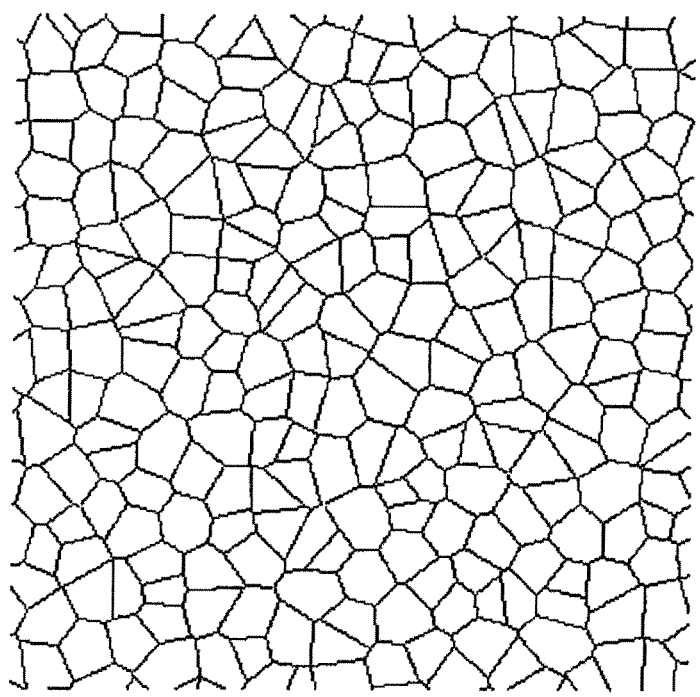
FIG. 1 illustrates a state in which a predetermined straight line is drawn on a heating line pattern of a heating element according to an exemplary embodiment of the present invention.

Hereinafter, the present invention will be described in detail.

A heating element according to an exemplary embodiment of the present invention includes a transparent substance; a conductive heating line that is provided on at least one side of the transparent substance; bus bars that is electrically connected to the conductive heating line; and a power portion that is connected to the bus bars, wherein 30% or more of the entire area of the transparent substance has a conductive heating line pattern in which is formed of closed figures where a distribution is continuous and a ratio (area distribution ratio) of a standard deviation in respects to an average value of areas of the closed figures is 2% or more.

As shown in the related art, in the case of when the transparent front side heating layer is formed, there is a problem in that resistance is very high. In addition, in the case of when the heating line is formed in a regular pattern having one or more shapes such as a grid manner or linear manner, diffraction and interference patterns of light may be generated by a difference between refractive indexes of the heating line and transparent substance. The patterns maximize the effect by the light source that is present after sunset such as headlight of the vehicle or streetlamp. Therefore, in the case of when the heating element that has the heating line is applied to the front window of the vehicle, the diffraction and interference patterns of light as described above may make safety and the degree of fatigue of the driver serious.

In the present invention, as described above, it is possible to prevent side effects by the interference of the light source that can be detected by the naked eye in a dark area because 30% or more, preferably 70%, and more preferably 90% or more of the entire area of the transparent substance has a conductive heating line pattern in which is formed of closed figures where a distribution is continuous and a ratio (area distribution ratio) of a standard deviation in respects to an average value of areas of the closed figures is 2% or more.

In the heating element according to an exemplary embodiment of the present invention, it is preferable that there are 100 closed figures.

The ratio (distance distribution ratio) of standard deviation in respects to an average value of areas of the closed figures is preferably 2% or more, more preferably 10% or more, even more preferably 20% or more.

It is preferable that the pattern that is formed of the closed figures having the ratio (distance distribution ratio) of standard deviation in respects to an average value of areas thereof is 2% or more is preferable to 30% or more in respects to the entire area of the transparent substance. As described above, the other type conductive heating line may be provided on a portion of the at least one side of the surface of the transparent substance that is provided with the heating line pattern.

In the present invention, as described above, by making the pattern of the heating line irregular, it is possible to provide the heating element that has the optical property where the standard deviation value of the intensity of light for each 5° in a circumferential direction of the light source which is measured when the light that is emitted from the light source that is disposed at the distance of 7 m from the heating element passes through the heating element is 15 or less. By this physical property, it is possible to prevent side effects by the interference of the light source that can be detected by the naked eye in a dark area.

Since there may be present a deviation according to the kind of light source, in the present invention, as the standard light source, an incandescent lamp of 100 W is used. The intensity of light is measured through a digital camera. The photographing condition of the camera is set so that, for example, F (aperture value) is 3.5, a shutter speed is 1/100, ISO is 400 and a black and white image is ensured. After the image is obtained by using the camera as described above, the intensity of light may be rated through an image analysis.

In the present invention, when the intensity of light is measured, the light source is disposed at the center of the black box that has the width of 30 cm, length of 15 cm, and the height of 30 cm, and the equipment where the circle that has the diameter of 12.7 mm is opened before the point of 7.5 cm from the center of the light source is used. The light source of the double phase measurement equipment device according to KS L 2007 standard is adopted. The digital image that is obtained by using the above condition is stored in 1600×1200 pixels, the intensity of light per each pixel is represented by the numerical value in the range of 0 to 255, and the area in the light source area per each pixel has the value in the range of 0.1 to 0.16 mm$^2$.

On the basis of the intensity of light per the pixel of the digital image, on the basis of the sum total of the left, right/upper and lower intensities, the position of the central pixel of the light source is obtained. On the basis of the central pixel of the light source, the average value of the intensities of light for each 5° by dividing the sum total of intensities of light of the pixel that corresponds to the angle of 5° by the number of the pixel. In the pixel that is used I the calculation, all pixels of 1200×1600 are not used, but when it is assumed that one pixel corresponds to the distance 1 by reducing the pixel as the coordinate value, only pixels that are present within the distance of 500 or less from the central pixel of the light source are used. Since the average value is calculated as one value for each 5°, it is reduced into 360°, 72 values are obtained. Therefore, the standard deviation that is calculated in the present invention is a value that corresponds to 72 standard deviations.

It is preferable that the measurement of the intensity of light is performed in the dark room. FIG. 13 illustrates the configuration of the equipment.

In the present invention, when light that is emitted from the light source that is distant from the heating element by 7 m penetrates the heating element, the standard deviation value of the intensities of light that is measured per each 5 in a circumferential direction of light source is 15 or less, more preferably 13 or less, and more preferably 10, and much more preferably 5 or less.

Meanwhile, in the case of when the patterns are completely irregular, in the distribution of the line, there may be a difference between a loose portion and a dense portion thereof. The distribution of the line may be visible by the eye even though the line width is very thin. In order to solve this problem of sight recognition, in the present invention, when the heating line is formed, regularity and irregularity may be appropriately harmonized. For example, the basic unit is set so that the heating line is visible or local heating is not formed, and in the basic unit, the heating line may be formed in an irregular pattern. If the above method is used, the visibility can be compensated by preventing the localization of the distribution of lines on the one point.

As described above, for the uniform heating and visibility of the heating element, it is preferable that the opening ratio of the pattern is constant in the unit area. It is preferable that the permeability deviation of the heating element is 5% or less in respects to a predetermined circle that has the diameter of 20 cm. In this case, the heating element may prevent the local heating. In addition, in the heating element, it is preferable that after the heating, the standard deviation of the surface temperature of the transparent substance is within 20%.

In the present invention, the heating line may be formed of the straight lines, or various modifications such as curved lines, wave lines, and zigzag lines may be feasible.

FIG. 1 illustrates a pattern of a conductive heating line of the heating element according to an exemplary embodiment of the present invention. The area distribution ratio of the pattern is 20% or more, for example, 20 to 35%.

According to an exemplary embodiment of the present invention, the conductive heating line pattern may be a boundary shape of the figures that form a Voronoi diagram.

Figure 4:
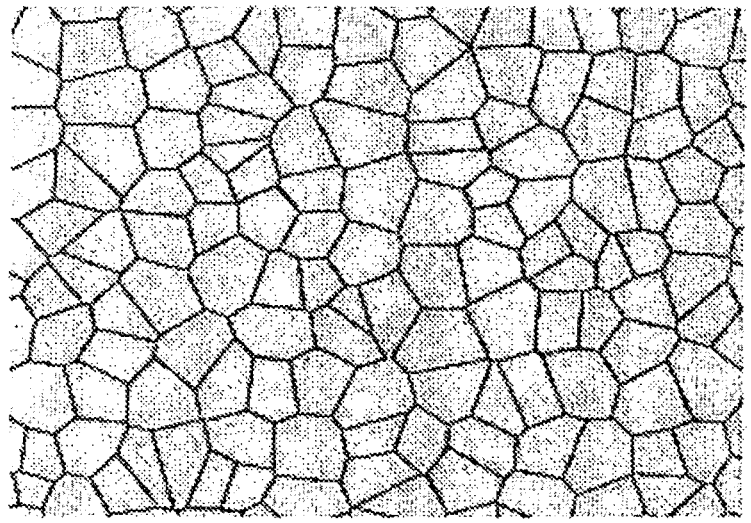
FIGS. 4 to 6 illustrate the conductive heating line pattern of the heating element according to an exemplary embodiment of the present invention.
Figure 5:
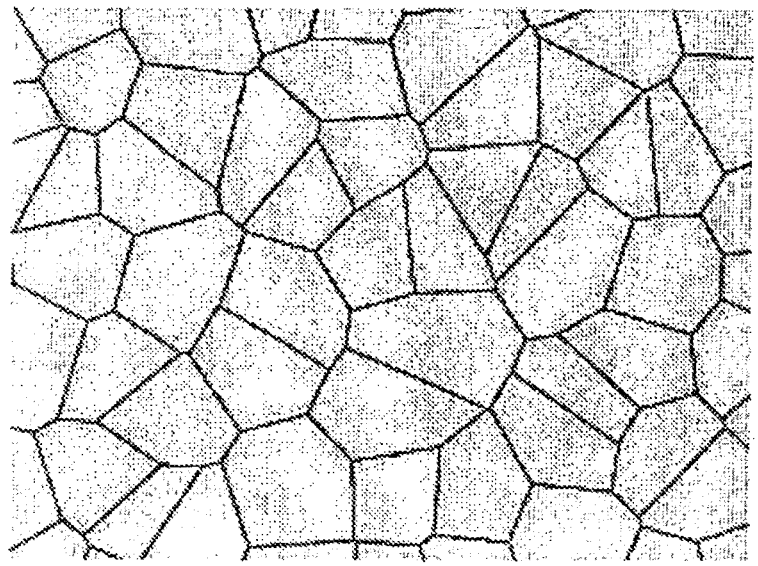
Figure 6:
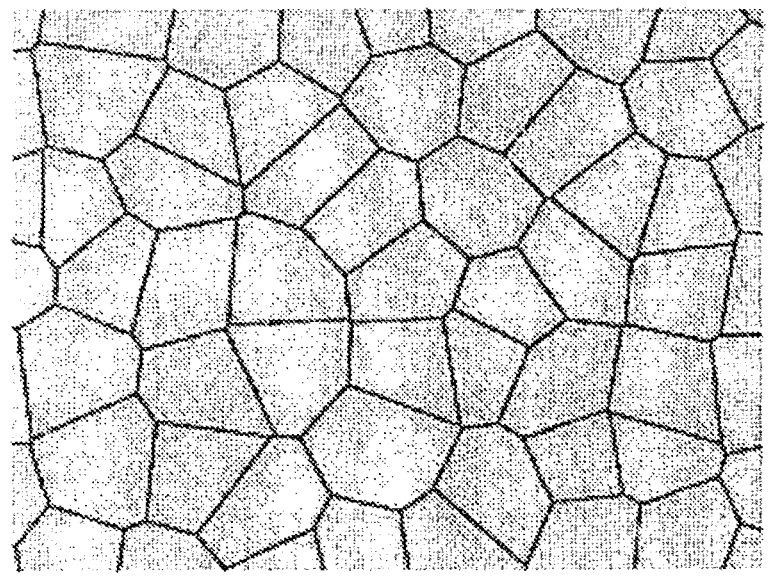

In the present invention, side effects by diffraction and interference of light can be minimized by forming the conductive heating line pattern in a boundary form of figures that configure the Voronoi diagram. The Voronoi diagram is a pattern that is formed by filling the closest area from the corresponding dot as compared to the distance of the dot from the other dots if Voronoi diagram generator dots are disposed in an area that will be filled. For example, when large discount stores in the whole country are represented by dots and consumers find the closest large discount store, the pattern that displays the commercial area of each discount store may be exemplified. That is, if the space is filled with regular hexagon and each dot of the regular hexagon is set by the Voronoi generator, the conductive heating line pattern may be a honeycomb structure. In the present invention, in the case of when the conductive heating line pattern is formed, there is an advantage in that the complex pattern form that can minimize the side effects by the diffraction and interference of light can be easily determined. FIG. 3 illustrates the forming of the pattern using the Voronoi diagram generator. An example of the other conductive heating line pattern is illustrated in FIGS. 4 to 6, but the scope of the present invention is not limited thereto.

In the present invention, the pattern that is obtained from the generator may be used by regularly or irregularly positioning the Voronoi diagram generator.

In the case of when the conductive heating line pattern is formed in a boundary form of the figures that form the Voronoi diagram, as described above, in order to solve the recognition problem, when the Voronoi diagram generator is generated, the regularity and irregularity may be appropriately harmonized. For example, after the area having a predetermined size is set as the basic unit in the area in which the pattern is provided, the dots are generated so that the distribution of dots in the basic unit has the irregularity, thus manufacturing the Voronoi pattern. If the above method is used, the visibility can be compensated by preventing the localization of the distribution of lines on the one point.

As described above, in the case of when the opening ratio of the pattern is made constant in the basic unit area for the uniform heating and visibility of the heating element, it is possible to control the number per unit area of the Voronoi diagram generator. In this case, when the number per unit area of the Voronoi diagram generator is uniformly controlled, the unit area is preferably 5 cm$^2$ or less and preferably 1 cm$^2$ or less. The number per unit area of the Voronoi diagram generator is preferably 25 to 2,500/cm$^2$ and more preferably 100 to 2,000/cm$^2$.

Among the figures that form the pattern in the unit area, at least one has preferably the different shape from the remaining figures.

According to another exemplary embodiment of the present invention, the conductive heating line pattern may be a boundary form of the figures that are formed of at least one triangle forming the Delaunay pattern. In detail, the form of the conductive heating line pattern is a boundary form of the triangles that form the Delaunay pattern, a boundary form of the figures formed of at least two triangles that form the Delaunay pattern or a combination thereof.

Figure 7:
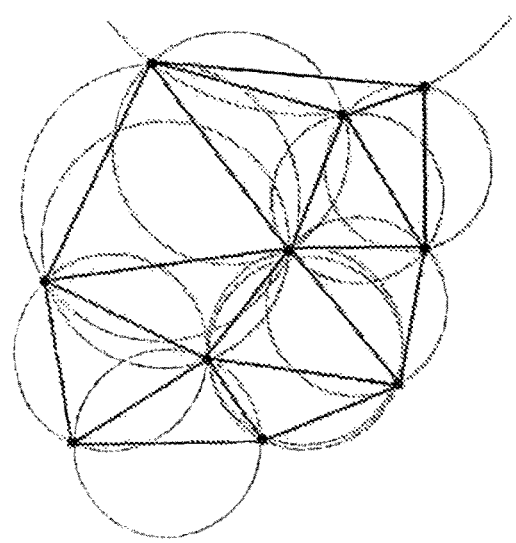
FIG. 7 illustrates forming the pattern by using the Delaunay pattern generator according to an exemplary embodiment of the present invention.
Figure 8:
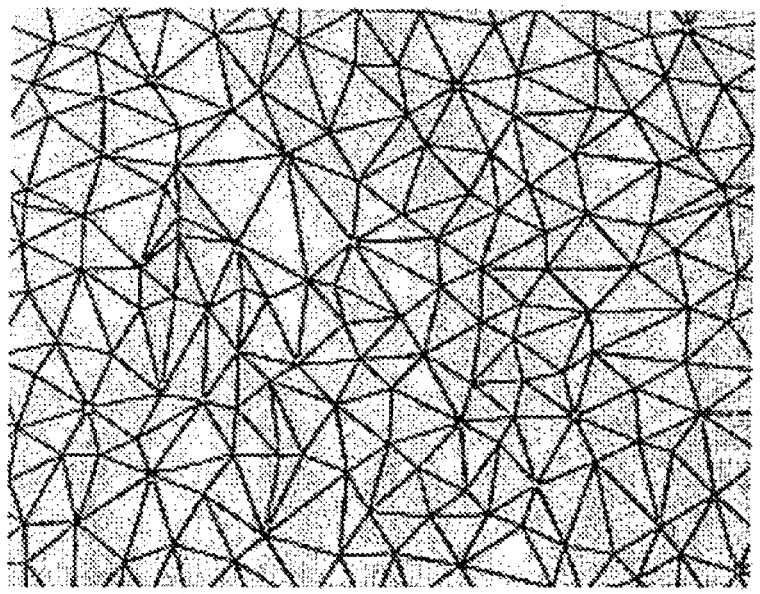
FIGS. 8 to 10 illustrate the conductive heating line pattern of the heating element according to an exemplary embodiment of the present invention.
Figure 9:
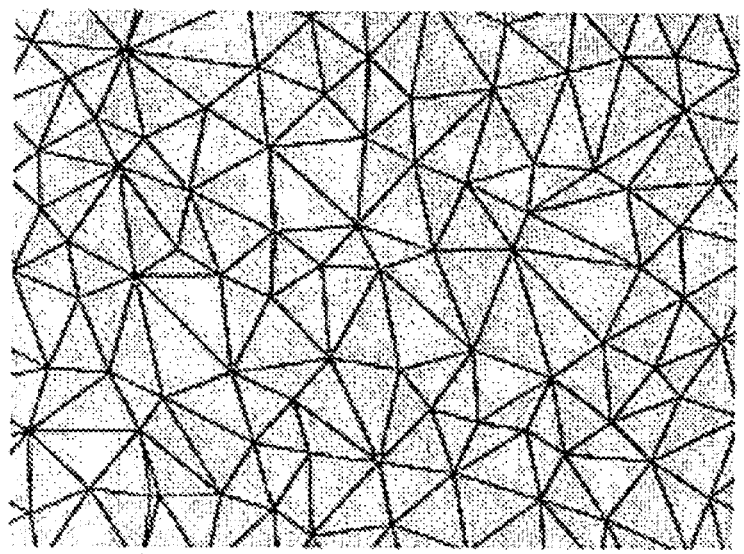

The side effects by diffraction and interference of light may be minimized by forming the boundary form of the figures that are formed of at least one triangle that forms the Delaunay pattern by using the conductive heating line pattern. The Delaunay pattern is a pattern that is formed by disposing the Delaunay pattern generator dots in the area in which the pattern will be filled and drawing a triangle by connecting three dots therearound so that when the circumcircle that includes all corners of the triangle is drawn, there is no other dot in the circle. In order to form the pattern, Delaunay triangulation and circulation may be repeated on the basis of the Delaunay pattern generator. The Delaunay triangulation may be performed in such a way that a thin triangle is avoided by maximizing the minimum angle of all angles of the triangle. The concept of the Delaunay pattern was proposed by Boris Delaunay in 1934. An example of formation of the Delaunay pattern is shown in FIG. 7. In addition, an example of the Delaunay pattern is shown in FIG. 8 and FIG. 9. However, the scope of the present invention is not limited thereto.

The pattern of the boundary form of the figures that are formed of at least one triangle that forms the Delaunay pattern may use the pattern that is obtained from the generator by regularly or irregularly positioning the Delaunay pattern generator. In the present invention, in the case of when the conductive heating line pattern is formed by using the Delaunay pattern generator, there is an advantage in that the complex pattern form that can minimize the side effects by the diffraction and interference of light can be easily determined.

In the case of when the conductive heating line pattern is formed in a boundary form of the figures that are formed of at least one triangle that forms the Delaunay pattern, as described above, in order to solve the recognition problem and local conductivity problem, when the Delaunay pattern generator is generated, the regularity and irregularity may be appropriately harmonized. For example, an irregular and uniform standard dot is generated in the area in which the pattern is provided. In this case, the irregularity means that the distances between the dots are not constant, and the uniformity means that the numbers of the dots that are included per unit area are the same as each other.

Figure 11:
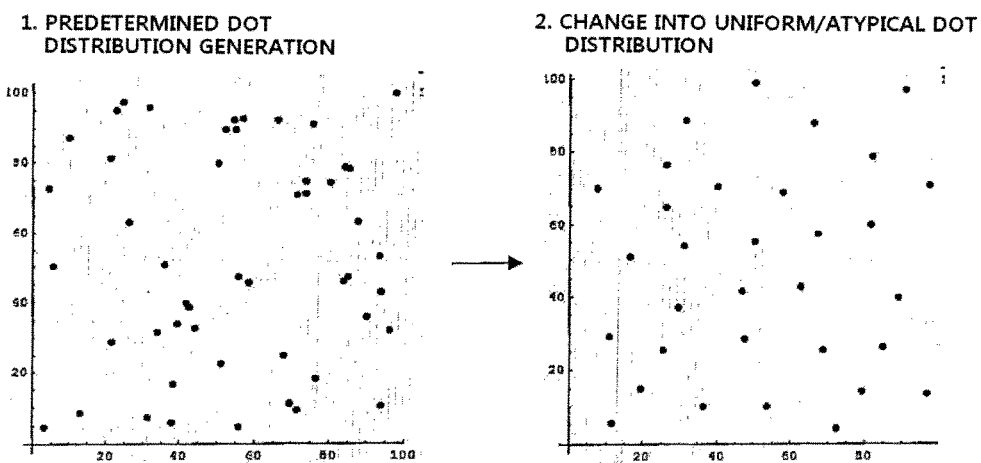
FIG. 11 illustrates the arrangement of the Delaunay pattern generator according to an exemplary embodiment of the present invention.

An example of the method for generating the irregular and uniform standard dots will be exemplified below. As shown in FIG. 11A, a predetermined dot is generated on the entire surface. After that, the interval between the generated dots is measured, and in the case of when the interval between the dots is smaller than the value that is previously set, the dots are removed. In addition, the Delaunay triangle pattern is formed on the basis of the dots, and in the case of when the area of the triangle is larger than the value that is previously set, the dots are added in the triangle. If the above process is performed repeatedly, as shown in FIG. 11B, the irregular and uniform standard dots are generated. Next, the Delaunay triangle that includes one generated standard dot is generated. In this step, it may be performed by using the Delaunay pattern. If the above method is used, the visibility can be compensated by preventing the localization of the distribution of lines on the one point.

As described above, in the case of when the opening ratio of the pattern is made constant in the basic unit area for the uniform conductivity and visibility of the heating element, it is possible to control the number per unit area of the Voronoi diagram generator. In this case, when the number per unit area of the Delaunay pattern generator is uniformly controlled, the unit area is preferably 5 cm$^2$ or less and more preferably 1 cm$^2$ or less. The number per unit area of the Voronoi diagram generator is preferably 25 to 2,500/cm$^2$ and more preferably 100 to 2,000/cm$^2$.

Among the figures that form the pattern in the unit area, at least one has preferably the different shape from the remaining figures.

In the present invention, in the case of when the heating line pattern is formed on the transparent substance by using the following method, the line width and line height may be made uniform. According to an exemplary embodiment of the present invention, at least a portion of the conductive heating line pattern may be different from the remaining pattern. The desired heating line pattern may be obtained by this configuration. For example, in the vehicle glass, in order to ensure the view field first in the area which corresponds to the front surface of the driver, the heating line patterns of the corresponding area and the remaining area may be different from each other. The line widths and line intervals of the printing pattern may be differ from each other so that at least a portion of the heating line pattern is different from the remaining printing pattern. Therefore, the heating may more rapidly or efficiently occur at a desired place.

According to an exemplary embodiment of the present invention, the heating element may include an area in which the conductive heating line is not formed. Transmission and reception that have a predetermined frequency can be performed by allowing at least a portion of the heating element not to form the conductive heating line, and information transmission and reception may be performed between the internal space and the external space. In this case, the area in which the conductive heating line is not formed may have an area that varies according to the desired frequency of the transmission and reception. For example, in order to pass the electromagnetic wave of 1.6 GHz that is used in the GPS, the area that has the long side that is ½ (9.4 cm) or more of the above wavelength is required. The area in which the conductive heating line is not formed may have an area that can transmit and receive the desired frequency, and its form is not particularly limited. For example, in the present invention, in order to pass the electromagnetic wave, the area in which the conductive heating line is not formed may the heating element that is provided with one or more semicircular areas that have the diameter of 5 to 20 cm.

According to an exemplary embodiment of the present invention, the conductive heating line may be blackened. If the paste that includes the metal material is sintered at the high temperature, metal gloss is shown, such that the visibility may be lowered because of the reflection of light. The problem may be prevented by blackening the conductive heating line. In order to blacken the conductive heating line, the blackening material may be added to the paste for forming the heating line or the blackening treatment may be performed after the paste is printed and sintered, thereby blackening the conductive heating line.

As the blackening material that may be added to the paste, there are metal oxide, carbon black, carbon nanotube, black pigment, colored glass frit and the like. In this case, the composition of the paste may include 50 to 90 wt % of the conductive heating line material, 1 to 20 wt % of organic binder, 1 to 10 wt % of blackening material, 0.1 to 10 wt % of glass frit, and 1 to 20 wt % of solvent.

When the blackening treatment is performed after the sintering, the composition of the paste may include 50 to 90 wt % of the conductive heating line material, 1 to 20 wt % of organic binder, 0.1 to 10 wt % of glass frit, and 1 to 20 wt % of solvent. The blackening treatment after the sintering includes dipping into the oxidized solution, for example, solution that includes the Fe or Cu ion, dipping into the solution that includes halogen ions such as a chlorine ion, dipping into hydrogen peroxide and nitric acids, and treatment using the halogen gas.

In order to maximize the minimization effect of side effects by the diffraction and interference of light, the conductive heating line pattern may be formed so that the area of the pattern that is formed of the figures having the asymmetric structure is larger than the entire pattern area by 10% or more. In addition, it may be formed so that the area of the figures in which at least one of the lines that connect the central point of any one figure that forms the Voronoi diagram and the central point of the adjacent figure forming the boundary in conjunction with the figure is different from the remaining lines in views of length is larger than the entire conductive heating line pattern area by 10% or more. In addition, it may be formed so that the area of the pattern formed of the figures where the length of at least one side that configures the figure that is formed of at least one triangle forming the Delaunay pattern is different from the length of the other sides is 10% or more in respects to the area where the pattern of the entire conductive heating line is formed.

When the heating line pattern is manufactured, after the pattern is designed in a limited area, the method in which the limited area is repeatedly connected is used to manufacture a large area pattern. In order to repeatedly connect the patterns, the repetitive patterns may be connected to each other by fixing the positions of the dots of each quadrilateral. In this case, the limited area has the area of preferably 1 cm$^2$ or more and more preferably 10 cm$^2$ or more in order to minimize the diffraction and interference by the repetition.

In the present invention, after the desired pattern form is determined first, the precise conductive heating line pattern that has the thin line width may be formed on the transparent substance by using a printing method, a photolithography method, a photography method, a method using a mask, a sputtering method, or an inkjet method. When the pattern form is determined, the Voronoi diagram generator or Delaunay pattern generator may be used, such that a complex pattern form may be easily determined. Here, the Voronoi diagram generator and Delaunay pattern generator mean the dots that are disposed so that the Voronoi diagram and Delaunay pattern generator are formed as described above. However, the scope of the present invention is not limited thereto, and the other method may be used when the desired pattern form is determined.

The printing method may be performed by using a method in which the paste that includes the conductive heating line material is transferred on the transparent substance in the desired pattern form and sintered. The transferring method is not particularly limited, but the above pattern form is formed on the pattern transferring medium such as an intaglio or screen and the desired pattern may be transferred on the transparent substance by using this. The method for forming the pattern form on the pattern transferring medium may be performed by using the method that is known in the art.

The printing method is not particularly limited, and a printing method such as offset printing, screen printing, and gravure printing may be used. The offset printing may be performed by using the method in which after the paste is filled in the intaglio on which the pattern is formed, first transferring is performed by using silicon rubber that is called as the blanket, and the second transferring is performed by closely contacting the blanket and the transparent substance. The screen printing may be performed by using the method in which after the paste is disposed on the screen on which the pattern is formed, the paste is directly provided on the substance through the screen that has the space while the squeeze is pushed. The gravure printing may be performed by using the method in which after the paste is filled in the pattern while the blanket where the pattern is formed on the roll is wound, it is transferred on the transparent substance. In the present invention, the above method may be used and the above methods may be used in combination. In addition, the other printing method that is known to those who are skilled in the art may be used.

In the case of the offset printing method, because of the release property of the blanket, since most of the paste is nearly transferred on the transparent substance such as glass, a separate blanket washing process is not required. The intaglio may be manufactured by precisely etching the glass on which the desired conductive heating line pattern is formed, and metal or DLC (diamond-like carbon) coating may be performed on the glass surface for the durability. The intaglio may be manufactured by etching the metal plate.

In the present invention, in order to implement the more precise conductive heating line pattern, it is preferable to use the offset printing method. FIG. 2 illustrates the offset printing method. According to FIG. 2, after the paste is filled in the pattern of the intaglio by using the doctor blade as the first step, the first transferring is performed by rotating the blanket, and as the second step, the second transferring is performed on the surface of the transparent substance by rotating the blanket.

In the present invention, it is not limited to the above printing method, and the photolithography process may be used. For example, the photolithography process may be performed by using the method in which the conductive heating line pattern material layer is formed on the entire surface of the transparent substance, the photoresist layer is formed thereon, the photoresist layer is patterned by the selective exposure and developing process, the conductive heating line is patterned by using the patterned photoresist layer as the mask, and the photoresist layer is removed.

The present invention may use the photolithography method. For example, after the picture photosensitive material that includes silver halide is coated on the transparent substance, the pattern may be formed by selectively exposing and developing the photosensitive material. A detailed example will be described below. First, the photosensitive material for negative is coated on the substance on which the pattern will be formed. In this case, as the substance, a polymer film such as PET, acetyl celluloid and the like may be used. The polymer film material on which the photosensitive material is coated is called as the film. The photosensitive material for negative was formed of silver halide in which AgBr that was very sensitive to light and regularly reacted with it and a small amount of AgI were mixed with each other. Since the image that is developed by picturing the general photosensitive material for negative is a negative picture that is opposite to the subject in terms of light and shade, the picturing may be performed by using the mask that has the pattern form that will be formed and preferably irregular pattern form.

In order to increase the conductivity of the heating line pattern that is formed by using the photolithography and photography process, a plating treatment may be further performed. The plating may use an electroless plating method, copper or nickel may be used as the plating material, and after the copper plating is performed, nickel plating may be performed thereon, but the scope of the present invention is not limited thereto.

The present invention may use the method using the mask. For example, after the mask that has the heating pattern is disposed close to the substance, it may be patterned by using the method for depositing the heating pattern material. In this case, the depositing method may use a heat deposition method by heat or electron beam, a PVD (physical vapor deposition) method such as sputter, and a CVD (chemical vapor deposition) method using an organometal material.

In the present invention, the transparent substance is not particularly limited, but it is preferable to use the substrate where the light permeability is 50% or more, and preferably 75% or more. In detail, glass may be used as the transparent substance, and the plastic substrate or plastic film may be used. In the case of when the plastic film is used, it is preferable that after the conductive heating line pattern is formed, glass is attached on at least one side of the substrate. In this case, it is more preferable that the glass or plastic substrate is attached to the side on which the conductive heating line pattern is formed. A material that is known in the art may be used as the plastic substrate or film, for example, it is preferable to use the film that has the visible ray permeability of 80% or more such as PET (Polyethylene terephthalate), PVB (polyvinylbutyral), PEN (polyethylene naphthalate), PES (polyethersulfon), PC (polycarbonate), and acetyl celluloid. The thickness of the plastic film is preferably 12.5 to 500 micrometers, and preferably 50 to 2500 micrometers.

In the present invention, it is preferable that as the conductive heating material, metal that has an excellent thermal conductivity is used. In addition, the specific resistance value of the conductive heating line material is in the range of 1 microOhm cm to 200 microOhm cm. As a detailed example of the conductive heating line material, copper, silver, carbon nanotube (CNT) may be used, and silver is most preferable. The conductive heating line material may be used in a particle form. In the present invention, as the conductive heating line material, copper particles that are coated with silver may be used.

In the present invention, in the case of when the paste that includes the conductive heating line material is used, the paste may further include an organic binder in addition to the conductive heating line material so as to easily perform the printing process. It is preferable that the organic binder has a volatile property in the sintering process. As the organic binder, there are polyacryl resin, polyurethane resin, polyester resin, polyolefine resin, polycarbonate resin and cellulose resin, polyimide resin, polyethylene naphthalate resin and denatured epoxy resin, but it is not limited thereto.

In order to improve the attachment ability of the paste to the transparent substance such as glass, the paste may further include a glass frit. The glass frit may be selected from commercial products, but it is preferable to use the environmentally friendly glass frit that includes no lead component. In this case, it is preferable that the average diameter of the glass frit is 2 micrometers or less and the maximum diameter thereof is 50 micrometers or less.

If necessary, a solvent may be further added to the paste. As the solvent, there are butyl carbitol acetate, carbitol acetate, cyclohexanon, cellosolve acetate) and terpineol, but it is not limited thereto.

In the present invention, in the case of when the paste that includes the conductive heating line material, organic binder, glass frit and solvent is used, it is preferable that the weight ratio of the conductive heating line material is 50 to 90%, the weight ratio of the organic binder is 1 to 20%, the weight ratio of the glass frit is 0.1 to 10% and the weight ratio of the solvent is 1 to 20%.

It may be formed so that the line width of the conductive heating line is 100 micrometers or less, preferably 30 micrometers or less, more preferably 25 micrometers or less.

In the present invention, in the case of when the above paste is used, if the paste is sintered after it is printed in the above pattern, the heating line pattern that has the conductivity is formed. In this case, the sintering temperature is not particularly limited, but it may be 500 to 800° C. and preferably 600 to 700° C. In the case of when the transparent substance that forms the heating line pattern is glass, if necessary, in the above sintering step, the glass may be shaped for the purpose of construction or vehicles. For example, in the step for shaping the glass for vehicles in a curved line, the paste may be sintered. In addition, in the case of when the plastic substrate or film is used as the transparent substance that forms the conductive heating pattern, it is preferable that the sintering is performed at a relatively low temperature. For example, it may be performed at 50 to 350° C.

In the method for manufacturing the heating element according to an exemplary embodiment of the present invention, the step for forming the bus bar that is electrically connected to the conductive heating line and the step for providing the power portion that is connected to the bus bar are performed. These steps may use a method that is known in the art. For example, the bus bar may be simultaneously formed in conjunction with the formation of the conductive heating line, and may be formed by using the same or other printing method after the conductive heating pattern is formed. For example, after the conductive heating line is formed by using the offset printing method, the bus bar may be formed through the screen printing. In this case, it is appropriate that the thickness of the bus bar is 1 to 100 micrometers and it is preferably 10 to 50 micrometers. If it is less than 1 micrometer, since the contact resistance between the conductive heating line and the bus bar is increased, local heating may be performed at the contact portion, and if it is more than 100 micrometers, the cost of the electrode material is increased. The connection between the bus bar and power may be performed through soldering and physical contact to the structure that has good conductive heating.

In order to conceal the conductive heating line and the bus bar, the black pattern may be formed. The black pattern may be printed by using the paste that includes cobalt oxides. In this case, it is appropriate the printing method is the screen printing, and its thickness is 10 to 100 micrometers. The conductive heating line and the bus bar may be formed before or after the black pattern is formed.

The heating element according to an exemplary embodiment of the present invention includes an additional transparent substance that is provided on a side on which the conductive heating line of the transparent substance is provided. When the additional transparent substance is attached, an adhesive film may be provided between the conductive heating line and additional transparent substance. In the course of attaching them, the temperature and pressure may be controlled.

In one detailed embodiment, the attachment film is inserted between the transparent substance on which the conductive heating pattern is formed and additional transparent substance, and they are put into the vacuum bag, and reduced in pressure or increased in temperature or increased in temperature by using the hot roll, thus removing the air, thereby accomplishing the first attachment. In this case, the pressure, temperature and time may vary according to the kind of the attachment film, and in general, the temperature may be gradually increased from normal temperature to 100° C. at a pressure of 300 to 700 Torr. In this case, it is preferable that the time is generally 1 hour or less. The preliminarily attached layered structure that is first attached is subjected to the second attachment process by the autoclave process where the temperature is increased while the pressure is added in the autoclave. The second attachment varies according to the kind of the attachment film, but it is preferable that after the attachment is performed at the pressure of 140 bar or more and the temperature in the range of 130 to 150° C. for 1 to 3 hours, and preferably about 2 hours, it is slowly cooled.

In the other detailed embodiment, the method for attaching them through one step by using the vacuum laminator device unlike the above two step attachment process may be used. The attachment may be performed by stepwisely increasing the temperature to 80 to 150° C. and cooling them so that the pressure is lowered (~5 mbar) until the temperature is 100° C. and thereafter the pressure is added (~1000 mbar).

Here, any material that has an adhesive strength and is transparent after attaching may be used as the material of the adhesive film. For example, the PVB film, EVA film, PU film and the like may be used, but is not limited thereto. The adhesive film is not particularly limited, but it is preferable that its thickness is in the range of 100 micrometers to 800 micrometers.

In the above method, the additional attached transparent substance may be formed of only the transparent substance and may be formed of the transparent substance that is provided with the conductive heating line that is manufactured as described above.

It is preferable that the line width of the conductive heating line of the heating element is 100 micrometers or less, preferably 30 micrometers or less, more preferably 25 micrometers or less and 5 micrometers or more. The interval between the lines of the conductive heating line is preferably 30 mm or less, more preferably 50 micrometers to 10 mm, and more preferably 200 micrometers to 0.65 mm. The height of the heating line is 1 to 100 micrometers, and more preferably 3 micrometers. The line width and line height of the heating line may be made uniform by the above methods. In the present invention, the uniformity of the heating line may be in the range of ±3 micrometers in the case of the line width and in the range of ±1 micrometer in the case of the line height.

The heating element according to an exemplary embodiment of the present invention may to the power for heating, and In this case, the heating amount is 100 to 700 W per $m^2$, and preferably 200 to 300 W. Since the heating element according to an exemplary embodiment of the present invention has excellent heating performance at the low voltage, for example, 30 V or less, and preferably 20 V or less, it may be usefully used in vehicles and the like. The resistance of the heating element is 5 ohm/square or less, preferably 1 ohm/square or less, and more preferably 0.5 ohm/square or less.

The heating element according to an exemplary embodiment of the present invention may have a shape of curved surface.

In the heating element according to an exemplary embodiment of the present invention, it is preferable that the opening ratio of the conductive heating line pattern, that is, the area ratio of the glass that is not covered with the pattern is 70% or more. The heating element according to an exemplary embodiment of the present invention has an excellent heating property where an opening ratio is 70% or more, the temperature deviation within 5 min after heating operation is maintained at 10%, and the temperature is increased.

The heating element according to an exemplary embodiment of the present invention may be applied to glass that is used for various transport means such as vehicles, ships, railroads, high-speed railroads, and airplanes, houses or other buildings. In particular, since the heating element according to an exemplary embodiment of the present invention has an excellent heating property at a low voltage, can minimize side effects by diffraction and interference of light source after sunset, and can be invisible in the above line width, unlike the known technology, it may be applied to the front window for transport means such as vehicles.

MODE FOR INVENTION

Hereinafter, the present invention is illustrated through Examples, but the scope of the present invention is not limited by them.

Example 1

The silver paste was manufactured by dissolving 80 wt % of silver particles that had the particle diameter of 2 micrometers, 5 wt % of polyester resin, 5 wt % of grass frit in 10 wt % of RCA (butyl carbitol acetate) solvent. As the intaglio, the glass that had the width of 20 micrometers, the depth of 7.5 micrometers and the Voronoi pattern was used. The Voronoi pattern that was the same as that of FIG. 1 was manufactured by setting the square of 0.09 mm$^2$ as the basic unit and providing irregularity to the distribution of dots in the basic unit. The ratio of the area distribution of the closed figure of the pattern was 23%.

After the silver pattern was formed on the glass substrate (100 mm×100 mm) by using the method that was shown in FIG. 2 and the offset printer, it was sintered at 600° C. for about 3 min to form the pattern shown in FIG. 1. The surface resistance of the glass substrate was 0.6 ohm/square, and the bus bar was formed by contacting the copper strip on the pattern by the clip in the direction of 100 mm. In this case, the resistance between both terminals was 0.6 ohm. In this case, when the voltage of 1.8 V was applied, the heating amount was 5.4 W (540 W/m$^2$). As a result of the measurement of the heating phenomenon by using the IR vision camera, the temperature was increased from 20° C. to 40° C. within 20 min. In addition, the temperature deviation percentage value that was obtained by dividing the difference between the maximum value and the minimum value of the temperatures that were measured 20 points by the average value was 6% or less for the measurement time. The visible ray permeability of the glass that had the conductive heating line pattern was 80%.

When the equipment shown in KS L 2007 was used, the incandescent lamp of 100 W (general bulb having a predetermined brightness was used) was installed at the distance of 7 m from the glass substrate that had the heating line, and light that is emitted from the light source penetrates the glass substrate that had the heating line, the digital image of 1600×1200 pixels was obtained by using. On the basis of the center of the light source, the image had the pixels within the distance of 500, the average value of the intensity of light per each 5°, and standard deviation value of the average values was calculated. The standard deviation value was 2. In addition, predetermined patterns by scattering of light were not observed around the light source.

Example 2

The silver paste was manufactured by dissolving 80 wt % of silver particles that had the particle diameter of 2 micrometers, 5 wt % of polyester resin, 5 wt % of grass frit in 10 wt % of BCA (butyl carbitol acetate) solvent. As the intaglio, the glass that had the width of 20 micrometers, the depth of 10 micrometers and the Delaunay pattern was used. The Delaunay pattern as shown in FIG. 8 was manufactured after being formed by making the distribution of dots in the basic unit 0.09 mm$^2$ irregular. The ratio of the area distribution of the closed figure of the pattern was 20%.

After the silver pattern was formed on the glass substrate (100 mm×100 mm) by using the method that was shown in FIG. 2 and the offset printer, it was sintered at 600° C. for about 3 min to form the pattern shown in FIG. 8. The surface resistance of the glass substrate was 1.0 ohm/square, and the bus bar was formed by contacting the copper strip on the pattern by the clip in the direction of 100 mm. In this case, the resistance between both terminals was 0.8 ohm. In this case, when the voltage of 2.0 V was applied, the heating amount was 5.0 W (500 W/m$^2$). As a result of the measurement of the heating phenomenon by using the IR vision camera, the temperature was increased from 20° C. to 40° C. within 20 min. In addition, the temperature deviation percentage value that was obtained by dividing the difference between the maximum value and the minimum value of the temperatures that were measured 20 points by the average value was 6% or less for the measurement time. The visible ray permeability of the glass that had the conductive heating line pattern was 70%. In this case, the standard deviation value of the intensity of light for each angle was 1.5. In addition, predetermined patterns by scattering of light were not observed around the light source.

Example 3

The same method as Example 1 was performed, except that only the basic unit was changed into 0.25 mm$^2$. In this case, the used pattern was the same as FIG. 9. The ratio of the area distribution of the closed figure of the pattern was 20%. In this case, the surface resistance was 1.2 ohm/square, and resistance between both ends of the glass substrate of 100 mm×100 mm was 1.5 ohm. The visible ray permeability of the glass that had the conductive heating line pattern was 83%. In this case, the standard deviation value of the intensity of light for each angle was 1.4. In addition, predetermined patterns by scattering of light were not observed around the light source.

Example 4

Figure 10:
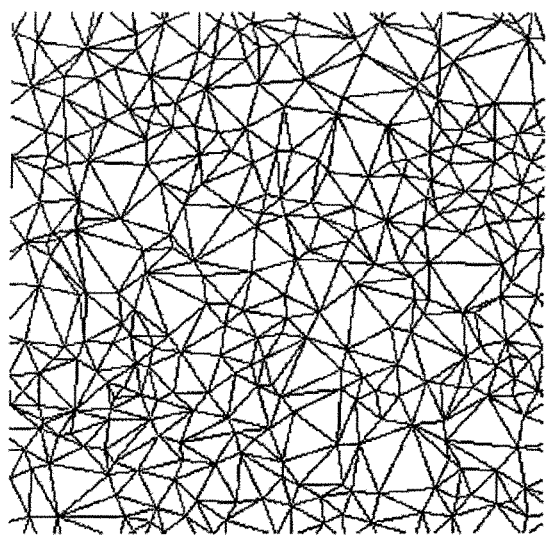

The same method as Example 2 was performed, except that only the basic unit was changed into 0.25 mm$^2$. In this case, the used pattern was the same as FIG. 10. The ratio of the area distribution of the closed figure of the pattern was 20%. In this case, the surface resistance was 1.2 ohm/square, and resistance between both ends of the glass substrate of 100 mm×100 mm was 1.0 ohm. The visible ray permeability of the glass that had the conductive heating line pattern was 76%. In this case, the standard deviation value of the intensity of light for each angle was 2.0. In addition, predetermined patterns by scattering of light were not observed around the light source.

Comparative Example 1

The grid pattern on the basis of the square of 0.09 mm$^2$ was manufactured, and the figure of the pattern was the same as that of FIG. 12. The ratio of the area distribution of the closed figure of the pattern was 0%. In this case, the surface resistance was 0.4 ohm/square, and resistance between both ends of the glass substrate of 100 mm×100 mm was 0.4 ohm. The visible ray permeability of the glass that had the conductive heating line pattern was 74%.

The light intensity experiment was performed by using the same method as Example 1. In this case, the standard deviation value of the intensity of light for each angle was 19.5. In addition, the strong interference patterns that had the cross shape were observed around the light source.

In the case of when the pattern of FIG. 12 shown as Comparative Example was used, the strong interference patterns that had the cross shape were observed around the light source. However, in the case of Examples, the scattering by the pattern was observed, but predetermined patterns were not observed.

The invention claimed is:
1. A heating element comprising:
   a transparent substance;
   a plurality of conductive heating lines provided on at least one side of the transparent substance, the plurality of conductive heating lines forming a pattern of irregularly distributed closed figures forming a boundary of figures that form a Voronoi diagram, wherein the pattern of irregularly distributed closed figures is continuous and covers at least 90% of the entire area of the transparent substance and includes at least 100 closed figures, and wherein a standard deviation of the area of the closed figures is between 20% and 100% of the average area of the closed figures; and
   bus bars that are electrically connected to the plurality of conductive heating lines,
   wherein the plurality of conductive heating lines forming a pattern of irregularly distributed closed figures minimize diffraction and interference such that a light intensity, which is measured when the light emitted from a light source that is disposed at a distance of 7 m from the heating element passes through the heating element for every 5° in a circumferential direction of the light source, has a maximum standard deviation of 15,
   wherein the plurality of conductive heating lines forming a pattern of irregularly distributed closed figures minimize diffraction and interference such that a light transmittance of the heating element with respect to a predetermined circle that has a diameter of 20 cm has a maximum standard deviation of 5%,
   wherein the conductive heating lines are provided at an interval of 50 micrometers to 0.65 mm between adjacent lines,
   wherein a line width of the plurality of conductive heating lines is between 5 micrometers to 100 micrometers, and a height of the plurality of conductive heating lines from the surface of the transparent substance is in the range of 1 to 100 micrometers,
   wherein an opening ratio of the plurality of conductive heating lines is 70% or more, the opening ratio being the ratio of an area of the transparent substance that is not covered with the pattern of irregularly distributed closed figures divided by the overall area, and
   wherein the plurality of conductive heating lines forming a pattern of irregularly distributed closed figures are configured to have a surface resistance of 5 ohm/square or less, and a heating amount of 100 to 500 W per m$^2$.

2. The heating element according to claim 1, wherein transparent substance is further provided on a side on which the conductive heating lines of the transparent substance are provided.

3. The heating element according to claim 1, wherein the transparent substance is glass, plastic substrate or plastic film.

4. The heating element according to claim 1, wherein the heating element includes an area in which the conductive heating lines are not formed.

5. The heating element according to claim 1, wherein the conductive heating lines are blackened.

6. The heating element according to claim 1, wherein the heating element is for a front window of vehicles.

7. The heating element according to claim 1, further comprising a power portion that is connected to the bus bars.

* * * * *